April 29, 1947.  P. JEPSON  2,419,560

ELECTRODE HOLDER

Filed April 21, 1944

Inventor
Percy Jepson
By Strauch & Hoffman
Attorneys

Patented Apr. 29, 1947

2,419,560

UNITED STATES PATENT OFFICE 2,419,560

ELECTRODE HOLDER

Percy Jepson, Oakland, Calif.

Application April 21, 1944, Serial No. 532,066

9 Claims. (Cl. 219—8)

1

My present invention relates to new and useful electrode holders and particularly to a hand actuable device for holding electrodes or welding rods for electric welding.

In electrode holders heretofore commonly employed the electrode is connected to the holder in but one position necessitating resort to the objectionable practice of bending the electrode in many uses of the rod. Furthermore, the grip of the holder on the electrode in devices now in use is uncertain and unreliable and the electrical connection thus frequently unsatisfactory.

Accordingly, it is a primary object of the present invention to provide a holder which will permit efficient and satisfactory connection of the electrode in any one of a plurality of positions of varying angular relation with the axis of the holder.

Another object of the invention is to provide an electrode holder which inherently provides a highly efficient electric contact, as to area of contact surface and contact pressure between the contact member of the holder and the electrode in all connection positions of the latter.

A further object of the invention is to provide an electrode holder in which the tip shell is provided with a multiplicity of electrode receiving apertures, the peripheral walls of which provide abutments at various angles to the longitudinal axis of the device against which the rod can be clamped firmly.

Still another object of the invention resides in the provision of an electrode holder having an electric contact member formed with a plurality of angularly related contact surfaces.

A still further object of the invention is to provide an electrode holder of simplified construction consisting of a minimum number of easily assembled parts.

Other objects of the invention will appear from the following detailed description of a preferred embodiment of my invention, and are such as may be attained by a utilization of the various novel principles, combinations and sub-combinations hereinafter set forth, and defined by the scope of the appended claims in the various relations to which they are applicable by persons skilled in the art.

2

Figure 1:
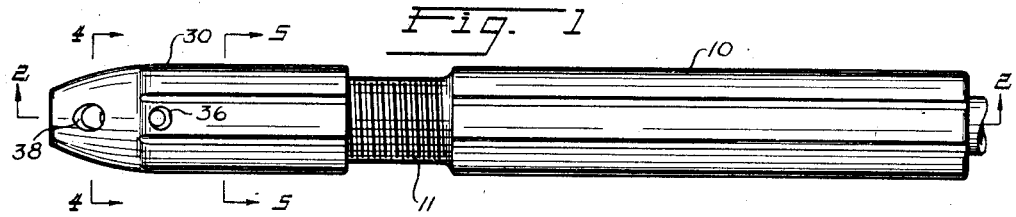
Figure 1 is a side elevational view of the assembled device.
Figure 4:
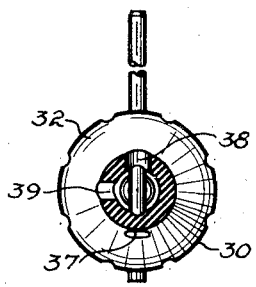

Figure 4 is an enlarged view in transverse section as seen on line 4—4 of Figure 1.

Figure 5:
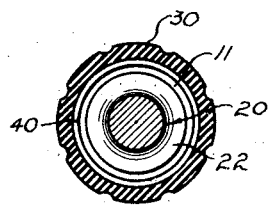

Figure 5 is an enlarged view in transverse section as seen on line 5—5 of Figure 1.

Figure 6:
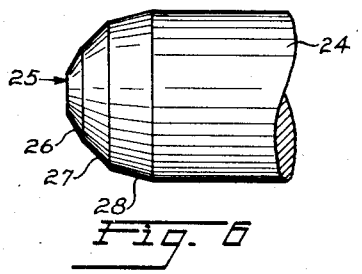

Figure 6 is an enlarged fragmental elevation of the forward portion of the contact stem.

Figure 7:
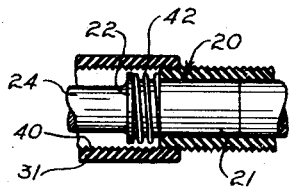

Figure 7 is a fragmental view in longitudinal section showing a modified form of the invention.

Figure 8:
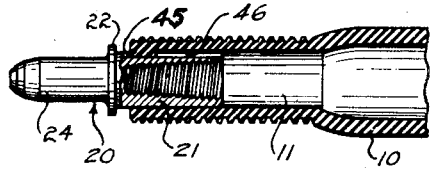

Figure 8 is a fragmental view mainly in longitudinal section showing another modified form of the invention.

Referring more particularly to the drawing:

10 designates a handle which may advantageously be of tubular form and of electric insulating material such as that known commercially as "Bakelite." At the forward part the handle is formed to provide a diametrically reduced exteriorly threaded neck portion 11. The handle has a smooth bore extending longitudinally therethrough.

Figure 2:
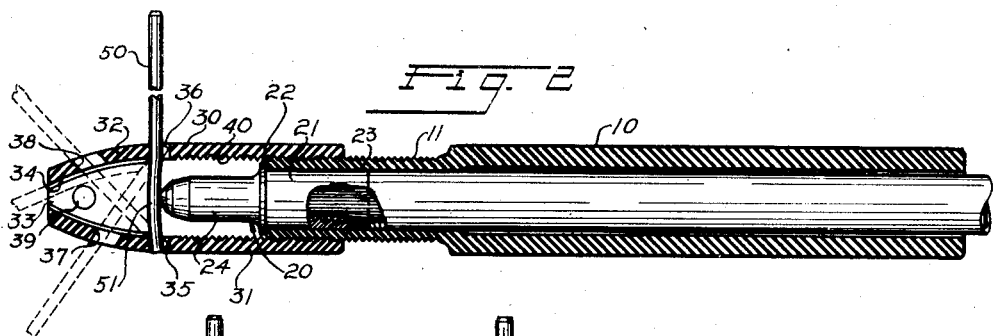
Figure 2 is a view in longitudinal section as seen on the line 2—2 of Figure 1.
Figure 3:
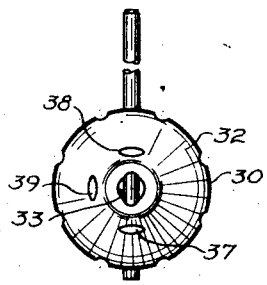
Figure 3 is an enlarged view in front elevation of the device.

Mounted in the forward end of the handle 10 is an electric conducting member indicated in its entirety at 20. Said member embodies a cylindrical shank portiton 21 having a turning fit in the neck 11. At the front end of this shank is formed an annular stop flange 22 disposed to abut the end of the neck to limit the inward movement of said shank portion. By reference to Figure 2 of the drawing it will be seen that the shank has an interiorly screw threaded bore 23 opening through its rear end and having a decreasing taper forwardly in the shank to provide a socket effective to engage an electric cable extended through the bore of the handle and screwed in said socket. Formed integral with and extending axially forward of the shank 21 is a stem portion 24 of cylindrical form from its juncture with the shank to a point short of its forward extremity and preferably of smaller diameter than the shank. That part of the stem forward of its cylindrical portion is shaped to provide a nose having a plurality of adjoining circumferential surfaces of varying angles of taper terminating in a flat end face 25 in a plane transverse to the axis of the stem. Thus, this end part constitutes a nose having, in the present example, three frustoconical surfaces 26, 27 and 28 of successively decreasing angles of taper from the end face inward, as illustrated at Figure 6. It will be understood that the number and particular angles of taper of the nose may be varied to suit particular conditions of use.

The holder also embodies a tip or clamping piece designated in its entirety at 30 and, in the illustrated embodiment of the device, in the form of a generally tubular shell. This shell has a rearward length 31 of cylindrical construction while its forward portion 32, of reduced length, is of conoidal configuration having, for example, the characteristics of a paraboloid. The front end of the shell is provided with an aperture 33 opening into the interior and into a pair of grooves 34, of V-shaped cross section, extending axially in diametrically opposed relation in the shell wall within the conoidal length 32. In addition to the aperture 33 the shell is provided with apertures 35, 36, 37, 38 and 39. Apertures or openings 35 and 36 are preferably disposed in diametrically opposed relation at the juncture of the conoidal and cylindrical portions of the shell and said apertures have a common axis transverse to that of the holder parts. The other apertures are formed at suitable axially and angularly spaced intervals and extend obliquely through the shell wall as illustrated. The interior of the cylindrical portion 31 is screw threaded, as indicated at 40, to engage the external threads of the handle neck 11. As will be noted from Figure 2, the electrode engaging shell and the contact stem are mounted co-axially with the handle.

In a modification of the device, shown at Figure 7, the stem is resiliently retractible to effect yielding contact with the electrode. This is accomplished by means of an open spiral spring 42 sleeved about the forward part of the shank 21 and held between the forward end of the neck 11 and the flange 22. Thus, when the electrode is pressed into conductive connection with the stem the spring 42 is brought under compression and exerts spring pressure upon the connection.

In another modification of the invention, shown in Figure 8, the conducting member 20 is associated with the neck 11 of the handle 10 in such manner that the shank portion 21 is free to slide axially in the neck but is restrained against rotation or angular movement therein. With this in mind the neck 11 is formed with an inwardly projecting longitudinally elongated key forming projection 45 at its forward end. The shank 21 of the conducting member is provided with a channel 46, opening exteriorly thereof and extending longitudinally from its rear end to the stop flange 22. This channel constitutes a key way designed to slidably receive the key 45 therein. Thus, the sliding, non-rotary connection of the conducting member with the handle enables rotation or turning of stem 24, fixed to the forward end of shank 21, with relation to an electrode (carried on the clamping shell) with which it makes contact in order to remove film from and brighten the contacting surfaces. The construction just described may be used when the flange 22 abuts against the handle end, as in Figure 2, or where a spring is interposed between said flange and said end as in Figure 7.

In the use of the present invention, an electrode, indicated at 50, may be connected with the holder by inserting one end through the aperture 35 and into the complementary aperture 36 with the shell adjusted to its forward position. Thereafter the shell is turned to adjust the same rearwardly with relation to the handle and to carry the electrode to a position wherein that part medially of its inserted portion is forced against the end face of the stem. Such adjustment may be carried to the extent of flexing the electrode, that is, to bow the portion within the shell as indicated at 51 in Figure 2, the in-herent resilience of which will insure a firm electrical contact between the rod and the nose. The connection thus effected firmly grips the electrode with its axis extending at an angle of approximately 90° with the axis of the shell. By inserting the electrode through aperture 37, in oblique position, with its inner end bearing against the grooved part of the opposite wall or engaging the edge of aperture 36 it can be brought into contact with the tapered contact surface 26 of the stem and held at an angle of about 60° with the axis of the shell longitudinally of the holder. To obtain an angular relation of 45° between the electrode and the holder the electrode is inserted through aperture 38 and makes contact with the stem surface 27. Connection of the electrode by insertion through the opening 39 mounts the same at an angle of about 75°. When inserted through the axial end aperture 33 the electrode may be disposed to engage either of the grooves 34 at a selected point along the length thereof and contacts with one of the frusto-conical surface areas to assume a desired angular position with relation to the axis of the holder. The conoidal longitudinal curvature of the forward part of the shell enables flexing of the electrode in all of its positions upon relative rotation of the shell with respect to the handle. It will thus be noted that in each of its varied positions the electrode makes highly efficient electrical contact with the stem, both from the viewpoint of contact area and pressure and is firmly gripped in the holder, and that the rod may easily be clamped in the angular position best suited for convenient application of the electrode to the particular job to be done.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore, intended to be embraced therein.

What is claimed and desired to be secured by United States Letters Patent is:

1. An electrode holder comprising a tubular handle, a conducting member having a portion fitting into the forward end of the handle and adapted for connection with a cable, a contact stem on the front end of the conducting member, said stem having a transverse front end face and a plurality of frusto-conical surfaces of successively decreasing angles of taper contiguous with said front face, and a tubular shell connected with the handle having a plurality of apertures adapted to selectively receive an electrode and to hold the same in contact with a selected surface on the stem in any one of a plurality of angularly disposed positions.

2. An electrode holder comprising a hollow handle, a contact element having a socket formed to receive and hold an electric cable, slidably mounted in one end of said handle so that said element protrudes therefrom, and a clamping member threadedly mounted on said handle surrounding and spaced from said element, said member providing a plurality of pairs of spaced angularly related electrode engaging surfaces at opposite sides of said contact element whereby upon adjustment of said clamping member with respect to said contact element said electrode may be flexed between said surfaces to insure firm and sufficient electrical contact between the electrode and contact element in the selected angular relation of the electrode to the longitudinal axis of the handle.

3. In an electrode holder having a handle, a contact member carried by the handle and having a series of adjoining coaxial frusto-conical electrode-engaging surfaces of successively decreasing angles of taper for cooperation with electrode clamping means on the handle.

4. In an electrode holder having a conductive contact carrying handle, a tubular shell connected with the handle in coacting relation with the contact and having a conoidal portion decreasingly tapered to an open front end, said conoidal portion having a plurality of circumferentially spaced internal grooves extending longitudinally therein from said open end to position the end of an electrode for holding engagement by the contact to dispose the electrode in any one of a multiplicity of positions in varying angular relation with the longitudinal axis of the shell.

5. In an electrode holder having a handle, a contact member supported axially of the handle and having a series of frusto-conical surfaces of successively decreasing angles of taper, and a tubular shell supported on the handle, said shell having a conoidal portion increasingly tapered to an open front end and cooperative with the contact member for holding an eelctrode inserted therein through the front opening in a plurality of positions of varying angular relation with the longitudinal axis of the contact member.

6. In an electrode holder, an electrode engaging contact, a tubular electrode positioning member enclosing said contact, and means connecting said contact and member for relative adjustment axially of said member, said member having an electrode receiving opening and being provided with internal means engageable by the inserted end of an electrode to selectively position the electrode through said opening at any one of a multiplicity of angles with relation to the axis of said tubular member, and said contact having a surface presenting substantially the same area of clamping engagement with the electrode in all angular positions thereof.

7. The electrode holder defined in claim 6 in which said electrode receiving opening is coaxial with the tubular member at one end thereof and said internal means comprises contiguous axially successive electrode engaging surfaces disposed at progressively decreasing angle inwardly from said opening with respect to the axis of said member.

8. In an electrode holder, a handle and a tubular electrode clamping member connected with one end thereof for relative axial adjustment, a contact mounted in the handle and projecting therefrom within the clamping member, said member at its forward end having an aperture and an internal surface extending rearwardly from said aperture in progressively increasing spaced relation from the axial centerline of said contact, whereby an electrode end inserted through said aperture may be clamped between said contact point and a point on said internal surface at a selected angle relative to the axis of said clamping member.

9. In an electrode holder, a handle and a tubular electrode clamping member connected with one end thereof for relative axial adjustment, a contact mounted in the handle and projecting therefrom within the clamping member, said member having diametrically opposed electrode receiving apertures and additional apertures longitudinally spaced from said first named apertures, through which an electrode may be selectively inserted with its end engaged in one of said first named apertures, whereby the electrode may be releasably clamped in engagement with said contact in any one of a plurality of angular positions with respect to the axis of the holder.

P. JEPSON.

REFERENCES CITED

The following references are of record in the file of this patent:

UNITED STATES PATENTS

| Number | Name | Date |
|---|---|---|
| 2,118,274 | Sweda | May 24, 1938 |
| 2,175,871 | Bourne | Oct. 10, 1939 |
| 2,233,618 | Leach | Mar. 4, 1941 |
| 2,282,316 | Albert | May 12, 1942 |
| 2,294,033 | Hooper et al. | Aug. 25, 1942 |
| 2,328,067 | Forgett | Aug. 31, 1943 |
| 2,330,931 | Stafford | Oct. 5, 1943 |
| 2,220,783 | Fitch | Nov. 5, 1940 |
| 1,348,530 | Willard | Aug. 3, 1920 |
| 1,337,662 | La Porte | Apr. 20, 1920 |